United States Patent Office 3,458,456
Patented July 29, 1969

3,458,456
COPOLYMERS FROM CYCLIC IMINOETHERS
Alan J. Levy and Morton H. Litt, Morristown, N.J., assignors to Allied Chemical Corporation, New York, N.Y., a corporation of New York
No Drawing. Filed Dec. 7, 1966, Ser. No. 599,718
Int. Cl. C08g 33/06, 23/00
U.S. Cl. 260—2          10 Claims

ABSTRACT OF THE DISCLOSURE

High molecular weight copolymers are formed without unduly prolonged reaction time by the copolymerization with cationic catalyst of a compound I of formula

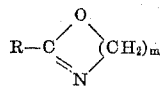

wherein $m$ is 2 or 3 and R is a member selected from the group consisting of hydrocarbon and halogenated hydrocarbon radicals of up to 20 carbon atoms and radicals of the formula $$R_1C—(R_2O)_n—R_3—$$

wherein $R_1$ is a member selected from the group consisting of monovalent hydrocarbon and halogenated hydrocarbon radicals containing up to 16 carbons, $R_2$ and $R_3$ are members selected from the group consisting of divalent hydrocarbon and halogenated hydrocarbon radicals containing up to 16 carbons, and $n$ is an integer from 0 to 3; with from 0.1 to 15.0 mol percent of a compound II of the formula

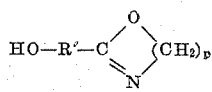

wherein $p$ is 2 or 3, and $R'$ is an alkyl or halogenated alkyl group of 1 to 17 carbon atoms or an alkenyl or halogenated alkenyl group of 4 to 17 atoms.

---

This invention relates to novel copolymers prepared by copolymerizing a first monomer which is a 2-substituted-2-oxazoline or a 2-substituted-5,6-dihydro-1,3,4H-oxazine having a nonreactive substituent on the 2-position with a second monomer which is a 2-substituted-2-oxazoline or a 2-substituted-5,6-dihydro-1,3,4H-oxazine having a reactive hydroxyl group on the 2-substituent.

In Belgian Patent No. 666,828 and in copending U.S. Patent No. 3,373,194, there is disclosed the preparation of novel carbon-nitrogen backbone chain polymers composed of repeating units which are represented by the formula:

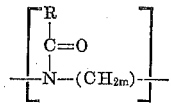

where $m$ is integer of 2 to 3, and R is a member selected from the group consisting of hydrocarbon radicals, such as alkyl, aryl, aralkyl, alicyclic and alkenyl groups, halogenated hydrocarbon radicals and radicals of the formula:

$$R_1—O—(R_2O)_n—R_3—$$

wherein $R_1$ is a member selected from the group consisting of monovalent hydrocarbon radicals such as alkyl, aryl and aralkyl groups and halogenated hydrocarbon radicals, $R_2$ and $R_3$ are members selected from the group consisting of divalent hydrocarbon radicals such as alkylene, alkylidene and arylene groups and halogenated hydrocarbon radicals, and $n$ is an integer from 0 to 3. Monomers employed in the preparation of these polymers are cyclic iminoethers of the formula:

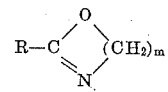

where R and $m$ have the meanings given above. While these polymers are highly useful, it has been found necessary to employ high monomer-to-catalyst ratios with long polymerization times in order to obtain high molecular weight materials, and thus the polymers are relatively expensive.

It is therefore an object of this invention to provide a process by which high molecular weight, high viscosity carbon-nitrogen backbone chain polymers of the above-described type can be more readily obtained.

Another object is to provide high molecular weight carbon-nitrogen backbone chain polymers which have properties similar to those of the polymers described above but which can be more readily prepared.

Additional objects and advantages of this invention will be apparent from the following detailed description thereof.

In accordance with the present invention, we have discovered that high molecular weight carbon-nitrogen backbone chain polymers can be readily obtained by copolymerizing a cyclic iminoether of the formula:

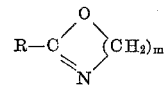

where R and $m$ have the meanings given above with a second cyclic iminoether having a hydroxy-containing substituent on the 2-position and being represented by the following formula:

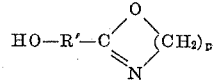

where $R'$ is an alkyl or halogenated alkyl group of 1 to 17 carbon atoms or an alkenyl or halogenated alkenyl group of 4 to 17 carbon atoms, and $p$ is an integer of 2 to 3.

Copolymerization is carried out in the presence of a cationic catalyst such as alkyl halides, boron-fluorine compounds, antimony-fluorine compounds, strong acids, salts of strong acids with an oxazoline or an oxazine, esters of strong acids, strongly acidic ion exchange resins and acid-activated clays. Illustrative of suitable catalysts are methyl iodide; 1,4 - dibromobutane; boron trifluoride etherate; antimony pentafluoride; p-toluene sulfonic acid; di-methyl sulfate; sulfuric acid; nitric acid; perchloric acid; hydrobromic acid; hydroiodic acid; methyl sulfate; methyl p-toluene sulfonate; salts of 2 - phenyl - 2 - oxazines with perchloric acid, hydroidic acid and toluene sulfonic acid and the perchlorate salt of 2 - (p - chlorophenyl) - 2 - oxazoline. The temperature at which the polymerization is carried out may range from about 80° C. to 250° C. with a preferable temperature range being from about 100° to 200° C.

The monomer-to-catalyst ratio is preferably from about 20:1 to 10,000:1, with optimum results being obtained within the range of 50:1 to 2,000:1. In general, as the monomer-to-catalyst ratio is increased, higher molecular weight materials can be obtained but longer polymerization times are required. When monomer-to-catalyst ratios above about 10,000:1 are used, no significant increase in the viscosity of the polymer is obtained.

The amount of monomer having an hydroxy-containing substituent which is added to the monomer of the Formula I should be controlled so that a sufficient amount is used to significantly increase the molecular weight of the polymer, while at the same time not using an amount which gels or cross links the polymer thus eliminating the solubility and thermoplastic properties possessed by homopolymers obtained from the monomers of the Formula I. In general, about 0.1 to 15 mole percent of the total amount of monomer used should be the hydroxy-containing monomer with the resulting copolymer being composed of a corresponding proportion of units derived from this monomer. Preferably about 0.4 to 5 mole percent of the hydroxy-containing monomer is used. The higher the monomer-to-catalyst ratio, the greater the tendency to gel with a given amount of hydroxy-substituted monomer. Thus, when high monomer-to-catalyst ratios are used, it is best not to employ more than about 2 mole percent of the hydroxy-containing monomer. However, high molecular weight, high viscosity polymers can be obtained with low monomer-to-catalyst ratios, if a correspondingly higher mole fraction of hydroxy-substituted monomer is used.

The monomer of the formula:

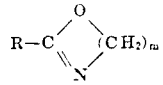

where R and $m$ have the meanings given above are 2-substituted - 2 - oxazolines and 2 - substituted - 5,6 - dihydro-1,3,4H-oxazines. Preferably R is alkyl of 1 to 20 carbon atoms such as methyl, isobutyl, pentyl, heptyl, undecyl and heptadecyl; halogenated alkyl of 1 to 20 carbon atoms such as dichloromethyl, trichloromethyl, pentafluoroethyl and pentadecafluoroheptyl; aryl such as phenyl and naphthyl; halogenated aryl such as p-chlorophenyl; aralkyl such as benzyl; alkylaryl such as tolyl; saturated alicyclic such as cyclohexyl; alkylene such as decenyl or an etheric group of the formula:

$$R_1-O(R_2O)_n-R_3-$$

where $R_1$ represents an alkyl radical containing 1 to 12 carbon atoms, an aryl radical containing 6 to 10 carbon atoms, an aralkyl radical containing 7 to 16 carbon atoms, and the chlorinated and fluorinated derivatives of these radicals; and $R_2$ and $R_3$ represent alkylene or alkylidene radicals containing 1 to 10 carbon atoms, divalent aromatic hydrocarbon radicals containing 6 to 10 carbon atoms, divalent aralkyl radicals containing 7 to 16 carbon atoms, and the chlorinated and fluorinated derivatives of these radicals. Specific examples of suitable $R_1$ groups are methyl, ethyl, isobutyl, pentyl, heptyl, dodecyl, phenyl, naphthyl, tolyl, benzyl, chloromethyl, fluoroethyl, and p-chlorophenyl. Specific examples of suitable $R_2$ and $R_3$ groups include methylene, ethylene, tetramethylene, butylidene, o-, m-, and p-phenylene, tolylene ($-C_6H_4CH_2-$), chloroethylene, fluoroethylene, and chlorophenylene. The number of carbon atoms in the radical R is not critical but preferably R contains from 1 to 21 carbon atoms.

These monomers can be prepared by known procedures such as those disclosed in Belgian Patents 666,828 and 666,829 and copending U.S. application Ser. No. 474,994 (U.S. Patent No. 3,373,194).

The monomers of the formula:

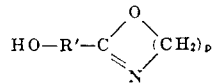

where R' and $p$ have the meanings given above are 2-substituted - 2 - oxazolines and 2 - substituted - 5,6-dihydro - 1,3,4H - oxazines having hydroxy - containing substituents on the 1-position. Preferably the compounds are primary or secondary alcohols, i.e. the carbon atom to which the hydroxy group is attached is in turn attached to either one or two other carbons atoms. Also it is preferred that the hydroxy groups be removed from the heterocyclic ring by at least 3 carbon atoms since this has been found to make the monomer more reactive. The monomer can be prepared by cyclodehydrating amides of the formula:

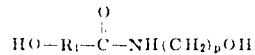

These amides are made by reacting a hydroxyalkyl carboxylic acid with an alkanol amine as illustrated in the following equation:

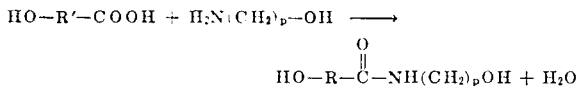

A detailed description of the preparation of the monomers is given in our copending application 599,691, entitled, "Novel Cyclic Iminoethers," filed concurrently herewith.

The polymers of this invention in which R is methyl, ethyl, isobutyl or an aliphatic ether or polyether are water soluble and are particularly useful as adhesives, as well as thickening agents in water soluble paints and aerosol sprays. The copolymers which are not soluble in water can be used in molding compositions, and those copolymers which are crystalline can be drawn into fibers useful in the manufacture of textiles.

The following examples are given to further illustrate the invention, but it is to be understood that the invention is not to be limited in any way by the details described therein. In the examples, parts are by weight.

Example 1

Into three polymerization tubes were placed the following reaction mixtures: Tube I, 5.7 parts of 2-isobutyl-2-oxazoline and 0.026 part of the perchlorate salt of 2-(p-chlorophenyl)-2-oxazoline.

Tube II, 5.85 parts of 2 - isobutyl - 2 - oxazoline, 0.15 part of 2-(5-hydroxypentyl)-2-oxazoline and .026 part of the perchlorate salt of 2-(p-chlorophenyl)-2-oxazoline; and Tube III, 5.78 parts of 2-isobutyl-2-oxazoline, 0.40 part of 2-(5-hydroxypentyl)-2-oxazoline and .026 part of the perchlorate salt of 2-(p-chlorophenyl)-2-oxazoline. The tubes were degassed and sealed under vacuum. The tubes were then placed in a bath at 100° C. and the temperature of the bath was slowly increased to 160° C. over a period of about 5 hours and then maintained at 160° C. for another 3 hours. After 75 minutes the temperature of the bath was 114° C. and each of the tubes contained a solid polymeric material. At the end of 8 hours the solid polymeric materials were removed and the reduced viscosity of the polymers from Tubes I and II were measured at 25° C. in 0.5% solutions in m-cresol. The polymer of Tube I had a reduced viscosity of 0.61, while the polymer of Tube II had a reduced viscosity of 2.05, indicating that the addition of the minor amount of 2 - (5 - hydroxypentyl) - 2 - oxazoline had greatly increased the molecular weight of the polymer. The polymer of Tube III was insoluble in the m-cresol indicating the cross linking had taken place.

Example 2

Other polymers of the present invention are obtained by replacing the 2-isobutyl-2-oxazoline of Example 1 with an equal molar amount of other 2-substituted-2-oxazolines or with suitable 2-substituted-5,6-dihydro-1,3-4H - oxazines. Illustrative of such compounds are: 2-methyl-2-oxazoline, 2-isopropyl-2-oxazoline, 2-n-heptyl-2-oxazoline, 2-decenyl-2-oxazoline, 2-undecyl-2-oxazoline; 2-phenyl-2-oxazoline, 2-dichloromethyl - 2 - oxazoline, 2-(β-naphthyl) - 2 - oxazoline, 2-(p-chlorophenyl)-2-oxazoline, 2-(p-tolyl)-2-oxazoline, 2-cyclohexyl-2-oxazoline, 2-perfluoroheptyl-2-oxazoline, 2-perfluoroethyl-2-oxazoline, 2-phenyl-5,6-dihydro-1,3,4H-oxazine, 2 - methyl-5,6-dihydro-1,3,4H-oxazine, 2-ethyl-5,6-dihydro-1,3,4H-oxazine, 2- pentyl-5,6-dihydro-1,3,4H-oxazine, 2-perfluoroheptyl-5,6-dihydro-1,3,4H-oxazine, $CH_3CH_2-O-CH_2-C\underset{N}{\overset{O}{\diagup\diagdown}}(CH_2)_3$, $CH_3-O-\langle\ \rangle-C\underset{N}{\overset{O}{\diagup\diagdown}}(CH_2)_3$ and $CH_3-O-(CH_2)_2-O-CH_2-C\underset{N}{\overset{O}{\diagup\diagdown}}(CH_2)_3$

Example 3

Additional copolymers of this invention are obtained by substituting for the 2-(5-hydroxypentyl)-2-oxazoline of Example 1 an equal molar amount of 2-(5-hydroxypentyl)-5,6-dihydro-1,3,4H-oxazine or an equal molar amount of a 2-substituted-2-oxazoline or 2-substituted-5,6-dihydro-1,3,4H-oxazine containing a different hydroxy-containing substituent on the 2-position. Illustrative of such substituents are: $-CH_2OH$, $-(CH_2)_4OH$, $-(CH_2)_{10}OH$, $-(CH_2)_{17}OH$, $-(CF_2)_3CH_2OH$ $-(CH_2)_2-\overset{OH}{\underset{|}{C}}H-CH_3$, $-(CH_2)_7CH=CHCH_2\overset{OH}{\underset{|}{C}}H(CH_2)_5CH_3$ and $(CH_2)_{10}-\overset{OH}{\underset{|}{C}}H(CH_2)_5-CH_3$ It will be apparent that many modifications and variations may be effected without departing from the scope of the novel concepts of the present invention, and the illustrative details disclosed therein are not to be construed as imposing undue limitations on the invention.

We claim:

1. Copolymer formed by the copolymerization with cationic catalyst of the compound I of the formula $R-C\underset{N}{\overset{O}{\diagup\diagdown}}(CH_2)_m$ wherein $m$ is 2 or 3 and R is a member selected from the group consisting of hydrocarbon and halogenated hydrocarbon radicals of up to 20 carbon atoms and radicals of the formula $R_1O-(R_2O)_n-R_3-$ wherein $R_1$ is a member selected from the group consisting of monovalent hydrocarbon and halogenated hydrocarbon radicals containing up to 16 carbons, $R_2$ and $R_3$ are members selected from the group consisting of divalent hydrocarbon and halogenated hydrocarbon radicals containing up to 16 carbons, and $n$ is an integer from 0 to 3; with from 0.1 to 15.0 mol percent of a compound II of the formula $HO-R'-C\underset{N}{\overset{O}{\diagup\diagdown}}(CH_2)_p$ wherein $p$ is 2 or 3, and R′ is an alkyl or halogenated alkyl group of up to 17 carbon atoms or an alkenyl or halogenated alkenyl group of 4 to 17 carbon atoms.

2. A copolymer in accordance with claim 1 wherein R is an alkyl group of up to 20 carbon atoms.

3. A copolymer in accordance with claim 1 wherein said compound II is a primary alcohol and wherein R′ is an alkyl group of up to 17 carbon atoms.

4. A copolymer in accordance with claim 3 wherein R′ contains at least 3 carbon atoms.

5. A copolymer in accordance with claim 1 wherein said compound II is 2-(5-hydroxypentyl)-2-oxazoline.

6. A copolymer in accordance with claim 1 wherein said compound I is copolymerized with from about 0.5 to 5.0 mol percent of compound II.

7. A copolymer in accordance with claim 1 wherein said compound I is 2-isobutyl-$\Delta^2$-oxazoline, and wherein said compound II is 2-(hydroxypentyl)-$\Delta^2$-oxazoline, and wherein said compound II is present in an amount of from about 0.5 to 5.0 mol percent of compound I.

8. A process for the preparation of high molecular weight carbon-nitrogen backbone chain copolymers comprising copolymerizing with a cationic catalyst at a monomer-to-catalyst ratio of 20:1 to 10,000:1 and a temperature of about 80° to 250° C. a compound I of the formula $R-C\underset{N}{\overset{O}{\diagup\diagdown}}(CH_2)_m$ wherein $m$ is 2 or 3 and R is a member selected from the group consisting of hydrocarbon and halogenated hydrocarbon radicals of up to 20 carbon atoms and radicals of the formula $R_1C-(R_2O)_n-R_3-$ wherein $R_1$ is a member selected from the group consisting of monovalent hydrocarbon and halogenated hydrocarbon radicals containing up to 16 carbons, $R_2$ and $R_3$ are members selected from the group consisting of divalent hydrocarbon and halogenated hydrocarbon radicals containing up to 16 carbons, and $n$ is an integer from 0 to 3; with from 0.1 to 15.0 mol percent of a compound II of the formula $HO-R'-C\underset{N}{\overset{O}{\diagup\diagdown}}(CH_2)_p$ wherein $p$ is 2 or 3, and R′ is an alkyl or halogenated alkyl group of up to 17 carbon atoms or an alkenyl or halogenated alkenyl group of 4 to 17 carbon atoms.

9. A process in accordance with claim 8 wherein the monomer-to-catalyst ratio ranges from about 50:1 to about 2000:1.

10. A process in accordance with claim 8 wherein said cationic catalyst is selected from the group consisting of alkyl halides, boron-fluorine compounds, antimony-fluorine compounds, strong acids, oxazine or oxazoline salts of strong acids, esters of strong acids; acidic ion exchange resins, and acid-activated clays.

References Cited

UNITED STATES PATENTS

| | | | |
|---|---|---|---|
| 3,251,778 | 5/1966 | Dickson et al. | 260—2 |
| 3,373,194 | 3/1968 | Fuhrmann et al. | 260—2 |
| 3,375,231 | 3/1968 | Fukui et al. | 260—2 |

FOREIGN PATENTS 666,828  11/1965  Belgium.

OTHER REFERENCES

Seeliger et al.: "Angewandte Chemie, International Ed.," vol. 5, October 1966, pp. 875–888.

Seeliger: German application 1,206,585, printed December 1965.

SAMUEL H. BLECH, Primary Examiner

U.S. Cl. X.R.

260—29.2, 77.5, 93.2, 244, 307

PO-1050
(5/69)

UNITED STATES PATENT OFFICE
CERTIFICATE OF CORRECTION

Patent No. 3,458,456    Dated July 29, 1969

Inventor(s) Alan J. Levy and Morton H. Litt

It is certified that error appears in the above-identified patent and that said Letters Patent are hereby corrected as shown below:

Column 1, line 58, that part of the formula reading "N-(CH$_{2m}$)" should read -- N-(CH$_2$)$_m$ --

Column 2, line 55, "hydroidic", should read --hydroiodic--.

Column 3, after the first formula there should appear --(I)--

Column 3, after the second formula there should appear --(II)--

Column 5, first formula; that part of the formula reading "(CH$_2$)," should read --(CH$_2$)$_2$,--

Claim 1, line 2, "the", first occurrence, should read -- a --

Claim 7, line 2, delete "and"

Claim 7, line 3, "2-(hydroxypentyl)-" should read -- 2-(5-hydroxypentyl)--

SIGNED AND
SEALED
SEP 1 - 1970

(SEAL)
Attest:

Edward M. Fletcher, Jr.
Attesting Officer

WILLIAM E. SCHUYLER, JR.
Commissioner of Patents